United States Patent [19]

Harwood et al.

[11] 4,148,058

[45] Apr. 3, 1979

[54] PAL SWITCHING CONTROL CIRCUIT

[75] Inventors: Leopold A. Harwood, Bridgewater, N.J.; Willem H. Groeneweg, Ottenbach; Alois V. Tuma, Schlieren, both of Switzerland

[73] Assignee: RCA Corporation, New York, N.Y.

[21] Appl. No.: 836,712

[22] Filed: Sep. 26, 1977

[51] Int. Cl.² .............................................. H04N 9/50
[52] U.S. Cl. ........................................ 358/24; 358/18; 358/27
[58] Field of Search ......................... 358/18, 19, 24, 27

[56] References Cited

U.S. PATENT DOCUMENTS

| 3,553,357 | 1/1971 | Carnt ...................................... 358/18 |
| 3,588,323 | 6/1971 | Krause .................................... 358/19 |
| 3,740,456 | 6/1973 | Harwood ............................... 358/19 |
| 3,794,754 | 2/1974 | Haferl ..................................... 358/24 |

FOREIGN PATENT DOCUMENTS 1902739  8/1970  Fed. Rep. of Germany ............. 358/18

OTHER PUBLICATIONS

Motorola Corp., TBA 395 Integrated Circuit, Functional Description, receipt date Sep. 2, 1976.

Primary Examiner—John C. Martin
Attorney, Agent, or Firm—Eugene M. Whitacre; William H. Meagher; Ronald H. Kurdyla

[57] ABSTRACT

In a PAL color television system for processing a color signal including burst and chrominance components alternating in phase at the image line scanning rate, identification and control circuitry for rapidly correcting an incorrect mode of line to line color demodulator switching. A bistable circuit generates timing signals for controlling line by line switching of a selected color demodulator (e.g., R-Y). An identification signal representative of an incorrect line switching mode is derived from information contained in the burst component, and serves to reset the bistable circuit such that timing signals corresponding to a correct switching mode are produced. The identification signal is derived by a filter circuit exhibiting a fast response time relative to the line scanning time, in order to rapidly respond to the switching mode identification information occurring at the line rate and thereby rapidly restore the correct demodulator switching mode.

8 Claims, 8 Drawing Figures

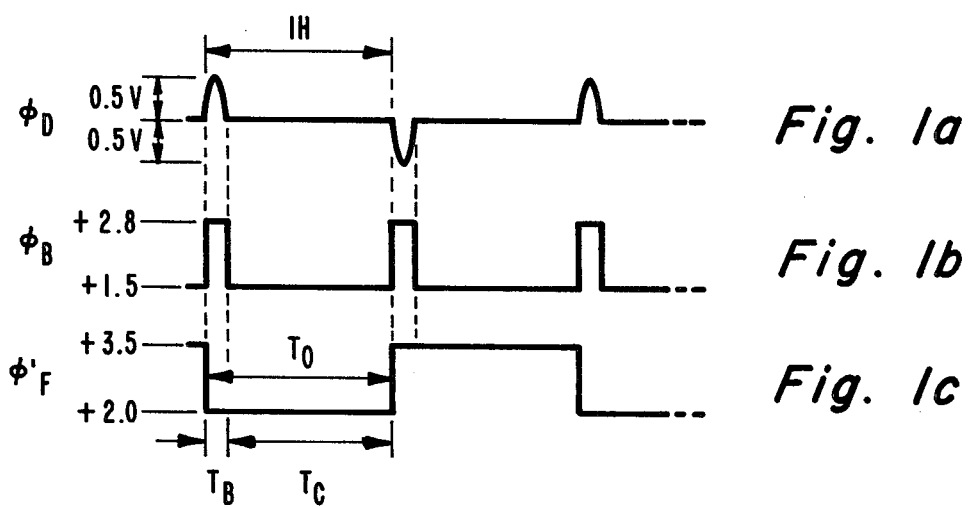
Fig. 1a
Fig. 1b
Fig. 1c
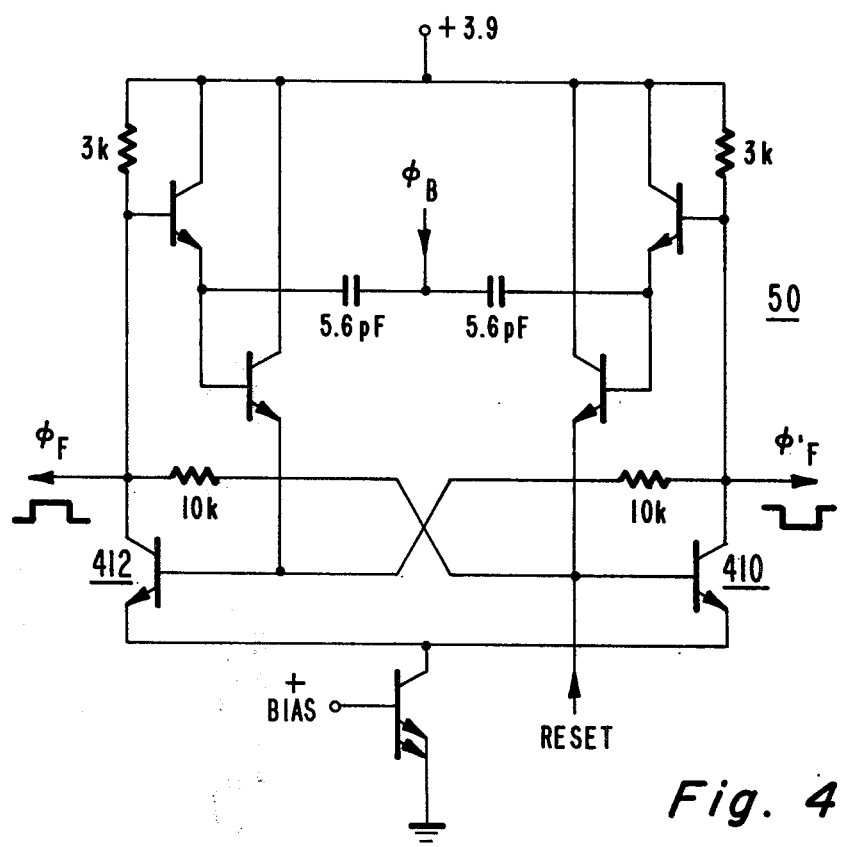
Fig. 4

PAL SWITCHING CONTROL CIRCUIT

This invention relates to a control circuit in the decoder of PAL (Phase Alteration at Line Rate) or SECAM type color television equipment for correcting an incorrect mode of line to line switching. The correct switching mode is restored rapidly and, in the case of equipment also including automatic color control (ACC) and color killer circuitry, the visible effects of such operation, which may otherwise be perceived by a viewer of a displayed image, are reduced to an acceptable minimum.

In the PAL color television system, the R-Y subcarrier component is switched in phase 180° from line to line at the broadcast encoder. In order to recover this R-Y component, corresponding line to line switching must occur at the decoder (e.g., in a receiver). It is conventional in a PAL color television receiver to switch the reference carrier signal input to the R-Y demodulator on a line to line basis, the reference carrier switch being driven by a suitably triggered bistable (flip-flop) circuit. Information necessary to identify the appropriate line by line switching is contained in the color burst component of the composite color signal, the phase of which is alternated in predetermined equal amounts leading and lagging a reference phase on a line by line basis. Additional details of the switching identification operation are set forth in U.S. Pat. No. 3,553,357 of Peter S. Carnt.

The predetermined phase relationship between the color burst component and locally generated timing signals, typically employed in a PAL decoder in conjunction with a PAL switch for switching the reference signal input to the R-Y demodulator to provide proper R-Y demodulation, can be undesirably upset for a variety of reasons. In the case of a color television receiver, for example, this phase relationship can be upset by switching from channel to channel. Noise signals can also upset the timing of the locally generated timing signals. In the case of a video signal recording medium such as disc or magnetic tape, discontinuities occurring in recorded materials or resulting during playback can produce effects similar to those produced when changing channels in a television receiver, thereby altering the phase relationship noted above.

When an incorrect switching mode exists as a consequence of one or more of the factors mentioned above, among others, it is desirable to provide a means of rapidly restoring a correct switching mode for proper demodulation of the R-Y component. This result is also important in a television signal processing system including provision for automatic color control (ACC).

An ACC network in a color television receiver serves to maintain a desired average level of color saturation (intensity) under varying signal strength conditions. The magnitude of the burst component can provide an indication of the strength of the received signal, since the burst magnitude is proportional to the magnitude of the received signal. Thus for example, the ACC network will automatically increase the level of the color signal in response to a detected burst component of relatively small magnitude. In addition, if the burst magnitude is below a given level, a so-called color killer circuit typically associated with the ACC network will inhibit the chrominance signal processing channel of the receiver, thereby causing a monochrome image to be produced. The color killer is also activated during the incorrect switching mode.

The operation of the ACC and color killer circuits in such a PAL system can be influenced by an incorrect switching mode. An incorrectly phased or absent burst component condition can cause improper decoding, and can cause the ACC circuit to increase the magnitude of the color signal while this condition persists. This action of the ACC circuit in turn causes a reproduced color image to exhibit visibly increased color saturation (i.e., "color blooming") until the color killer is activated. This effect can be objectionable to a viewer and, accordingly, it is desirable to minimize such effect in a PAL color television signal processing system.

Switching control apparatus in accordance with the present invention is included in a system for processing a color television signal containing a luminance component, deflection synchronizing components at respective line and field rates, and chrominance and burst components exhibiting a prescribed mutual timing relationship and altering in phase on a line by line basis. The system also includes a chrominance channel for processing the chrominance component, and a plurality of demodulators for demodulating selected phases of the chrominance component, one demodulator being switched on a line by line basis. Proper operation of the system requires that the switched demodulator be switched in correct timing synchronism with line by line alternation of signals received by the system. The switching control apparatus comprises timing means responsive to locally generated trigger pulses occurring at the line rate, for providing half line frequency timing signals to establish the line by line switching of the switched demodulator. When the demodulator switching occurs with incorrect timing synchronism, an identification signal is derived from the signals processed by the chrominance channel by means of a circuit exhibiting a fast response time relative to the line rate. When present, the derived identification signal is utilized as a supplementary trigger input to the timing means, for resetting the timing means to provide timing signals corresponding to correct line by line timing synchronism.

In the drawing:

FIGS. 1a–1c depict signal waveforms helpful in understanding the present invention;

FIGS. 3–5 are schematic circuit diagrams of portions of the arrangement shown in FIG. 1.

Figure 1:
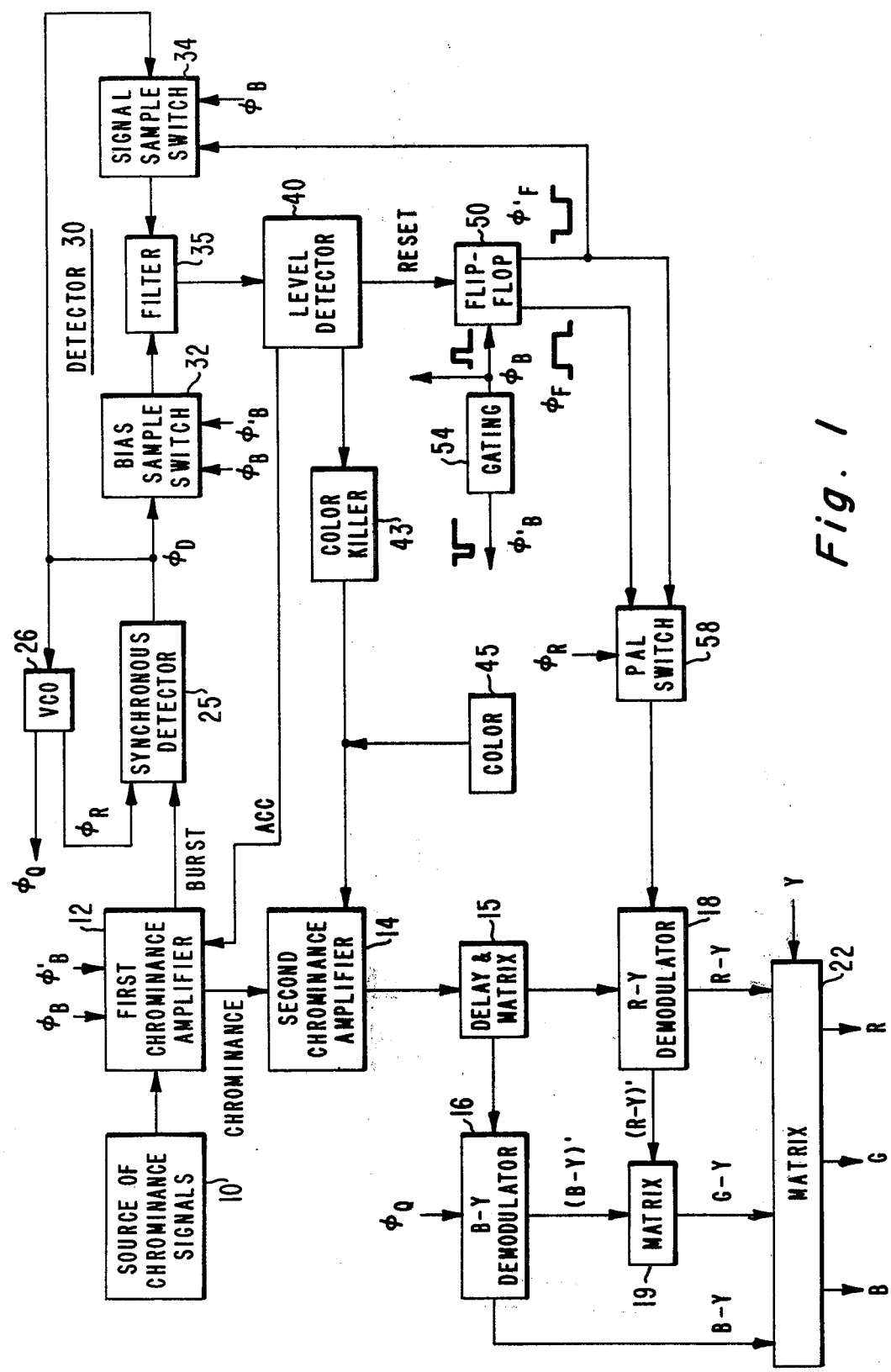
FIG. 1 illustrates a general arrangement in block diagram form of a portion of a chrominance signal processing channel in a color television receiver arranged in accordance with PAL signal processing standards and suitable for utilizing the present invention.

In FIG. 1, a signal source 10 supplies a color image signal including a periodic color synchronizing burst component and a chrominance component imposed as amplitude modulation at selected phases of a suppressed color subcarrier of approximately 4.43 MHz (in accordance with one PAL standard) to an input of a gated first chrominance amplifier 12. The burst component typically comprises approximately ten cycles of unmodulated color subcarrier in phase with the subcarrier and transmitted during the synchronizing interval following the end of each line of image information of the transmitted television signal. The color burst information is present only for a relatively short time interval of approximately 2.5 microseconds of each horizontal image scanning line of about sixty-four microseconds duration. Amplifier 12 provides separated chrominance and burst components in response to locally generated, complementary phase burst gate signals $\phi_B$ and $\phi_B'$, the former signal being shown in FIG. 1b. The burst gate pulses of duration $T_B$ substantially coincide with the burst component interval. Amplifier 12 can be of the type described in U.S. Pat. No. 4,038,681 (L. A. Harwood).

The separated chrominance component from amplifier 12 is amplified by a second, gain controlled chrominance amplifier 14 which can be of the type disclosed in U.S. Pat. No. 3,740,462—L. A. Harwood. The amplified chrominance component from amplifier 14 is delayed approximately one horizontal scanning line by a PAL delay line included in a delay and matrix unit 15. Output signals from unit 15 are supplied to synchronous signal demodulators 16 and 18 which provide demodulated B-Y and R-Y color difference signals. Demodulators 16 and 18 also respectively provide versions of the demodulated color difference signals, (B-Y)' and (R-Y)', which are combined in a matrix 19 to produce a color difference signal G-Y. As is known, the R-Y, B-Y and G-Y color difference signals are combined in a matrix 22 with a luminance signal Y from a luminance channel of the receiver to provide R, B and G color signals, which are then suitably applied to a color image reproducing kinescope (not shown).

The separated burst component from amplifier 12 and a reference subcarrier signal $\phi_R$ from a voltage controlled oscillator (VCO) 26 are supplied as inputs to a wideband synchronous phase detector 25 of the type described in U.S. Pat. Nos. 3,740,456 and 3,740,461 of L. A. Harwood. Detector 25 produces an output signal $\phi_D$ representative of the phase and/or frequency difference between the signal $\phi_R$ from VCO 26 and the burst component from amplifier 12. Detected signal $\phi_D$ in turn is supplied as a synchronizing signal input to VCO 26 through an appropriate filter network (not shown) for providing a signal representative of the average level of signal $\phi_D$. Oscillator 26 also provides a subcarrier reference signal $\phi_Q$ in quadrature phase relation with signal $\phi_R$. Oscillator signal $\phi_Q$ is applied to demodulator 16 for demodulating the B-Y signal phase, and signal $\phi_R$ is applied to demodulator 18 via a PAL switch 58 for demodulating the R-Y signal. An oscillator suitable for use as VCO 26 is disclosed in U.S. Pat. No. 4,020,500—L. A. Harwood.

Detected burst representative signal $\phi_D$ (FIG. 1a) comprises periodic pulses of alternating positive and negative going direction (i.e., complementary phase) from one horizontal image scanning line (1 H) to the next. The duration of these pulses typically is less than the burst gate interval $T_B$. The positive and negative pulses of signal $\phi_D$ respectively recur at a 7.8 KHz rate, or one half the line scanning rate of 15.6 KHz. In this instance a synchronized oscillator condition is assumed, whereby the pulses comprising signal $\phi_D$ exhibit uniform magnitude.

Signal $\phi_D$ also is coupled to a detector 30 including a gated bias sample and hold switch 32, a gated signal sample and hold switch 34 and a filter 35 as generally described in U.S. Pat. Nos. 3,740,456 and 3,740,461. A level detector 40 responds to a control signal generated by filter 35 for providing an ACC signal to control the gain of first amplifier 12, and a control signal input to a color killer circuit 43 which serves to disable second chrominance amplifier 14 under existing or apparent weak color signal or monochrome signal conditions. A color control 45 (e.g., a viewer adjustable potentiometer) serves to adjust the color saturation of a reproduced color image by varying the gain of second amplifier 14.

Figure 3:
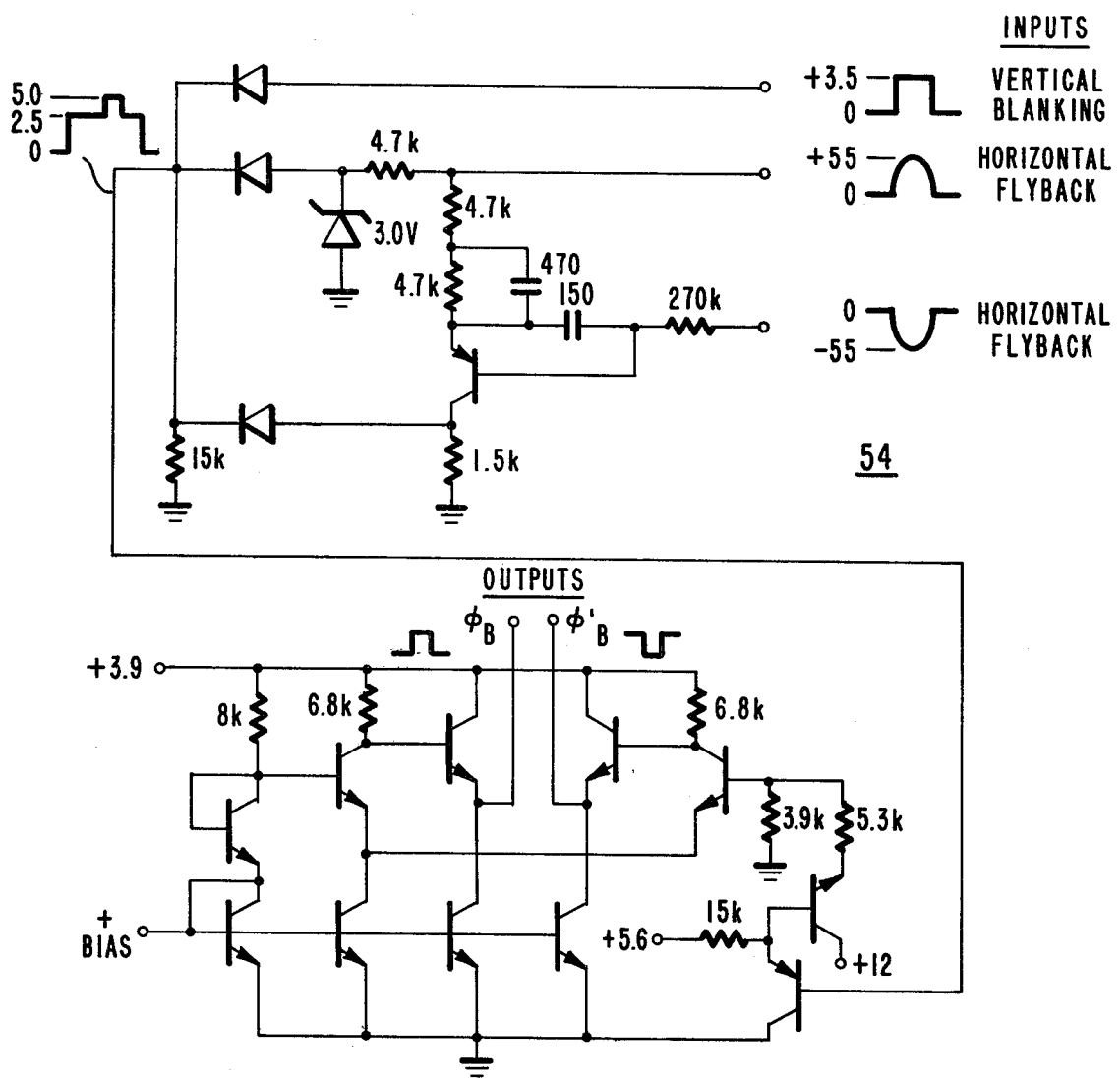
Figure 5:
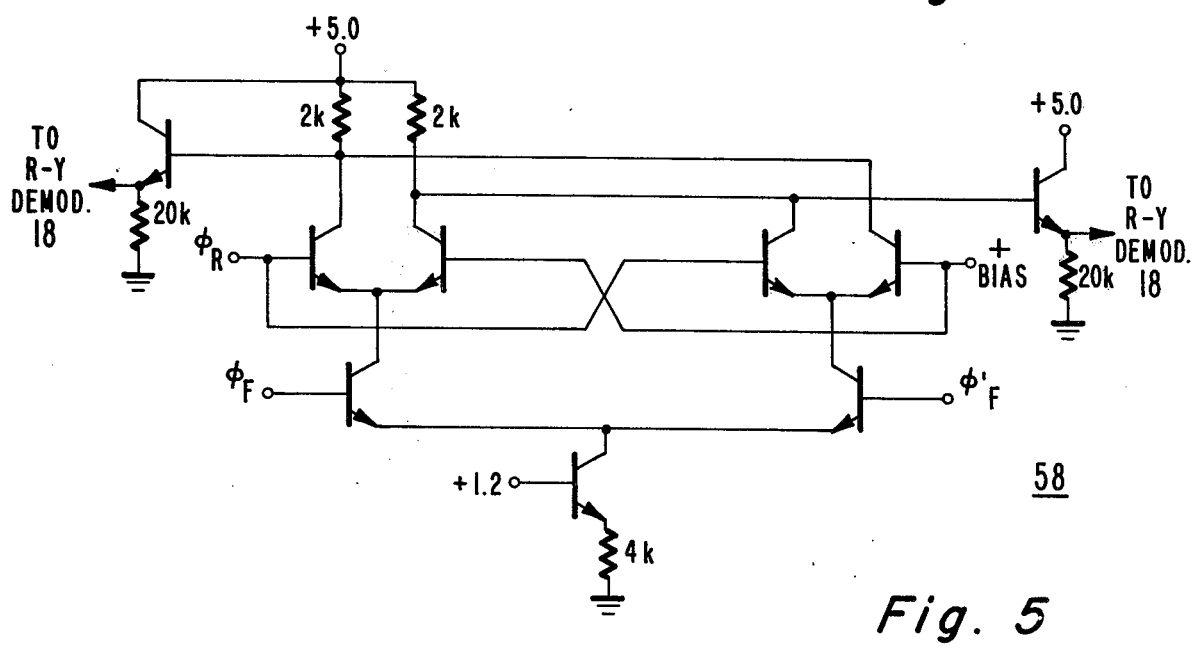

Level detector 40 also provides a RESET signal for altering the operation of a flip-flop 50 (e.g., a bistable multivibrator) under circumstances to be discussed, such that a correct output signal phase is produced. Flip-flop 50 is normally triggered in response to the leading edge of burst gate signal $\phi_B$ from a gating unit 54, which provides complementary phase burst gating signals $\phi_B$ (FIG. 1b) and $\phi_B'$ at the line scanning rate. A suitable circuit configuration for gating unit 54 is shown in FIG. 3. Complementary phase output signals $\phi_F'$ (FIG. 1c) and $\phi_F$ from flip-flop 50 serve as synchronizing timing signals for PAL switch 58 so that demodulator 18 receives an appropriate phase of subcarrier reference signal $\phi_R$ for properly demodulating the R-Y component. Signals $\phi_F$ and $\phi_F'$ recur at one-half the line scanning rate and are normally in correct synchronism with the burst component. The $\phi_F'$ output signal from flip-flop 50 together with burst gate signal $\phi_B$ control the operation of signal sampling switch 34, as will be discussed. A suitable circuit arrangement of flip-flop 50 for deriving signals $\phi_F$ and $\phi_F'$ in response to line frequency input signals supplied from deflection circuits of the receiver is shown in FIG. 4. PAL switch 58 may take the form shown in FIG. 5.

Figure 2:
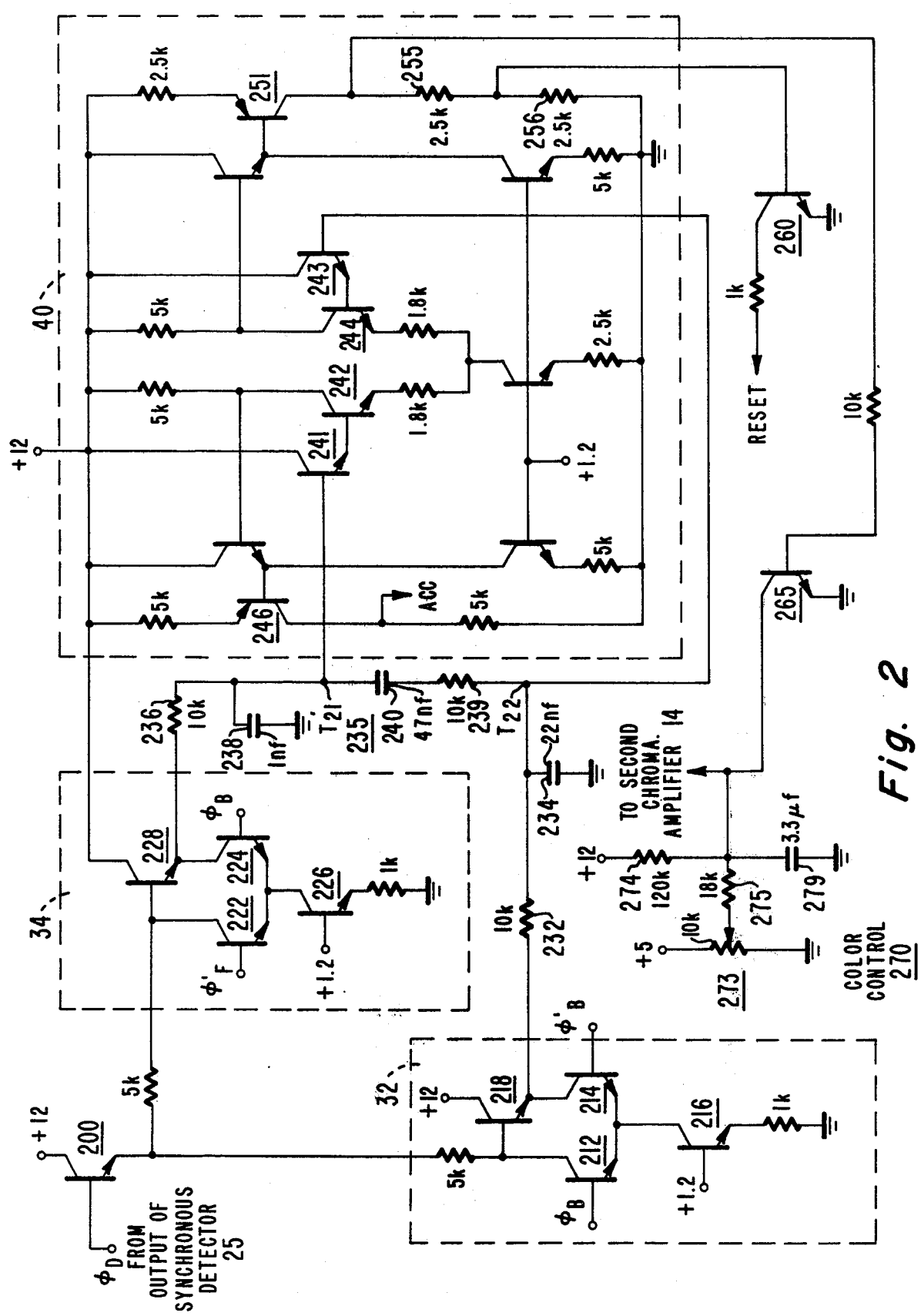
FIG. 2 shows a schematic circuit diagram of a portion of the arrangement shown in FIG. 1 in accordance with the present invention.

Reference is now made to the circuit of FIG. 2 together with FIG. 1. In FIG. 2, detected burst representative signal $\phi_D$ from the output of detector 25 is direct coupled at low impedance via an isolation follower transistor 200 to signal sampling switch circuit 34 and bias sampling switch circuit 32. Switch 34 forms a signal sample and hold network with a filter circuit including a resistor 236 and a storage capacitor 238 together defining a first RC time constant, and switch 32 forms a bias sample and hold network with a filter circuit including a resistor 232 and a storage capacitor 234 together defining a second, relatively longer RC time constant.

Signal sampling circuit 34 comprises differentially arranged switching transistors 222 and 224, a current source transistor 226, and a keyed follower transistor 228, all arranged as shown. A low impedance emitter output of transistor 228 is coupled to a first terminal $T_{21}$ by means of a network including resistor 236 and capacitor 238. Bias sampling circuit 32 is similar to circuit 34 and includes differentially connected switching transistors 212 and 214, a current source transistor 216, and a keyed follower transistor 216, also arranged as shown. An emitter output of follower transistor 218 is coupled to a second terminal $T_{22}$ by means of a network including resistor 232 and capacitor 234. A voltage smoothing filter network including a series capacitor 240 and a resistor 239 is coupled between terminals $T_{21}$ and $T_{22}$, and forms a filter network 235 together with elements 232, 234 and 236, 238.

The general operation of sampling switches 32 and 34 is described in detail in U.S. Pat. No. 3,740,456 mentioned previously. Also, the particular operation of switch 34 in response to signals $\phi_F'$ and $\phi_B$ is discussed in a copending U.S. patent application Ser. No. 836,420 of W. H. Groeneweg entitled "PAL Identification Circuit", filed concurrently with this application and assigned to the present assignee.

Bias and signal sampling circuits 32 and 34 operate in a complementary manner between low and high impedance states (i.e., while one is sampling the output of detector 25, the other is off and vice-versa) for alternately coupling and decoupling the output of detector 25 to and from the associated filter networks. Bias switch 32 samples the quiescent D.C. voltage level of the output from detector 25 during the interval of signal $\phi_D$ which is devoid of the burst representative pulses ($T_C$ in FIG. 1a), at which time switching circuit 34 is inoperative. A positive direct voltage representative of this level is developed on and stored by capacitor 234. For purposes of simplicity it is assumed that this direct voltage remains substantially constant.

Normally positive or negative pulses each representative of the magnitude of a corresponding sampled pulse of signal $\phi_D$ are developed on and stored by capacitor 238, and appear at terminal $T_{21}$, as follows. When signal $\phi_F'$ at the base of transistor 222 is relatively negative (i.e., sufficient to render transistor 222 nonconductive) and signal $\phi_B$ at the base of transistor 224 is relatively positive (i.e., sufficient to render transistor 224 conductive) follower 228 is keyed on and the pulse of signal $\phi_D$ then present at the base of transistor 228 is transmitted via the base-emitter junction of transistor 228 to capacitor 238. A relatively positive or negative pulse voltage corresponding to the magnitude of the transmitted pulse then appears at terminal $T_{21}$.

When signal $\phi_F'$ is relatively positive, transistor 222 is rendered conductive. Collector current of transistor 222 depletes the base current drive of transistor 228, causing transistor 228 to turn off and thereby preventing the pulses of signal $\phi_D$ from being transmitted to capacitor 238 and terminal $T_{21}$. In this instance capacitor 238 retains the charge deposited during the last preceding sampling interval, reduced by leakage currents (e.g., the very small base current of follower transistor 241). Observations analogous to the above apply to the switching operation of sampling switch 32 in response to signals $\phi_B$ and $\phi_B'$.

In this example, circuit 34 normally samples the positive-going pulses from detector 25 during each interval $T_B$ under correct timing conditions. Each positive pulse is sampled (i.e., only every other pulse of signal $\phi_D$ is normally sampled) when positive burst gate pulses $\phi_B$ occur during the "negative" interval of signal $\phi_F'$ ($T_O$ in FIG. 1c). This relative timing of signals $\phi_F'$ and $\phi_B$ whereby positive pulses are sampled corresponds to a normal or correct timing condition in this instance.

The normally positive potential developed on terminal $T_{21}$ with respect to $T_{22}$ as discussed is coupled to base inputs of differential comparator transistors 242 and 244 via follower transistors 241 and 243, respectively, included within level detector circuit 40. Under normal signal conditions, predetermined ACC and color killer control voltages respectively appear at collector outputs of PNP transistors 246 and 251. Also included in circuit 40 is a voltage divider delay network comprising series resistors 255 and 256 coupled to the collector of transistor 251.

The voltage developed on terminal $T_{21}$ becomes less positive under weak received color signal conditions, since detected burst representative signal $\phi_D$ will then exhibit a corresponding reduced amplitude. In response to this condition, the ACC voltage at the collector of transistor 241 correspondingly decreases in a direction for increasing the gain of first chrominance amplifier 12 to compensate. Increasingly weaker received signals cause the collector voltage of transistor 251 to rise by a corresponding amount sufficient to render a color killer transistor 265 conductive to provide a collector output control signal for disabling second chrominance amplifier 14. A normally nonconductive control transistor 260 provides a collector output RESET signal for resetting flip-flop 50 when an incorrect switching condition exists, as will be discussed. Transistor 260 conducts to provide the RESET signal in response to the voltage developed at the junction of voltage divider resistors 255 and 266, which serve as a delay network such that transistor 260 conducts after transistor 265 has been rendered conductive.

An incorrect PAL switching condition is considered to exist when the timing relationship between burst gate pulse $\phi_B$ and interval $T_O$ of flip-flop timing signal $\phi_F'$ is such that sampling switch 34 is caused to sample negative pulses of signal $\phi_D$. This incorrect timing condition essentially corresponds to an incorrect timing relationship of the burst component and the flip-flop switching signal, and can result for a variety of reasons, some of which have been mentioned earlier. It is desirable to rapidly correct this condition.

The described incorrect timing condition causes the filtered voltage appearing at terminal $T_{21}$ to exhibit a negative-going (less positive) magnitude, since circuit 34 then samples the negative-going pulses rather than the positive pulses of signal $\phi_D$. Capacitor 238 then charges in response to the magnitude of the negative-going pulses, causing a negative-going voltage pulse to appear at terminal $T_{21}$. This voltage is hereinafter referred to as the identification voltage.

It is noted that the values of resistor 236 and capacitor 238 are chosen to permit capacitor 238 to respond rapidly to the relatively short duration (approximately 2.5 microseconds) pulses of signal $\phi_D$, while providing satisfactory noise immune performance by bypassing high frequency noise and spurious signals to ground. More specifically, the resistance-capacitance time constants associated with filter networks 236, 238 and 239, 240 determine a response time which is sufficiently fast to provide a rapid response to switching mode identification information supplied by the burst representative pulses of signal $\phi_D$ at the line scanning rate. This rapid response time permits an identification voltage of suitable magnitude to be developed at terminal $T_{21}$ in response to the magnitude of a single negative pulse of signal $\phi_D$. Also, the value of capacitor 240 is selected to smooth the voltage developed between terminals $T_{21}$ and $T_{22}$ particularly during each vertical retrace interval, during which time this voltage could otherwise be sufficiently disturbed to cause shading of a reproduced image as a result of ACC action in response to this voltage.

It is also noted that the response time of filter circuit 236, 238 is significantly faster than the response time associated with the color killer operation. The latter response time is a function of a time constant defined by the effective collector-emitter impedance of color killer transistor 265 when conducting, together with the value of a filter capacitor 279 of a color control circuit 270, also including resistors 274, 275 and a viewer adjustable potentiometer 273, all arranged as shown. The response time of the color killer action is sufficiently long, or slow, so that the color killer circuit does not respond to rapid or instantaneous changes of the received signal level (e.g., due to noise or a rapid decline in the magnitude of the received color signal) under normal, correct timing conditions. Otherwise, the visible effect of color killer operation in response to such changes may be objectionable to a viewer.

The identification pulse voltage produced at terminal $T_{21}$ in response to the incorrect timing condition causes the control voltage at the collector of transistor 251 and thereby the voltage at the junction of resistors 255, 256 to rise a corresponding amount, causing control transistor 260 to produce a negative-going RESET pulse for resetting flip-flop 50. The control signal from transistor 251 is also applied to the base input of color killer transistor 265, but second chrominance amplifier 14 is not immediately disabled because of the relatively long color killer response time.

The RESET pulse from transistor 260 alters the operation of flip-flop 50 in a manner to produce the correct timing pulse of signal $\phi_F'$ after an incorrect switching mode is identified. This can be accomplished between one sampling interval and the next, as discussed below in connection with the FIG. 4 circuit embodiment of flip-flop 50.

For an incorrect switching condition during a given signal sampling interval, a negative-going burst representative pulse of signal $\phi_D$ appears at the base of transistor 228 (FIG. 2). Cross-coupled flip-flop switching transistors 410, 412 (FIG. 4) are respectively conductive and non-conductive, thereby producing complementary phase collector output signals $\phi_F'$ and $\phi_F$ of relatively negative and positive magnitude as shown. A negative-going RESET pulse is then generated as a consequence of the negative identification voltage pulse during the sampling interval. The RESET pulse is generated rapidly and resets flip-flop 50 by rendering flip-flop transistors 410 and 412 respectively non-conductive and conductive, thereby causing the respective collector outputs ($\phi_F'$ and $\phi_F$) to reverse polarity. The resulting relatively positive level of signal $\phi_F'$ is produced substantially in time coincidence with the end of the associated burst gate pulse interval due to the fast switching action of flip-flop 50. This condition of signal $\phi_F'$ corresponds to a correct timing condition, since signal $\phi_F'$ will exhibit a relatively negative magnitude when flip-flop 50 is triggered by the leading edge of the next following burst gate pulse $\phi_B$. At this time, a positive burst representative pulse of signal $\phi_D$ will be present and will be sampled. A resulting positive identification voltage manifesting the correct timing mode will then be developed, and the normal operation of flip-flop 50 is left undisturbed during the correct timing mode.

Thus the correct timing condition is rapidly re-established typically within one image line by dimensioning the circuit time constants in the manner discussed. Proper demodulation of the R-Y component therefore is restored quickly.

Restoration of the correct timing condition may require more than one sampling cycle (i.e. more than one image line) in some instances, since the magnitude of the derived identification pulse depends on the magnitude of a particular sampled negative pulse of signal $\phi_D$. For example, the magnitude of the separated burst component from amplifier 12 may be below a given level when weak received color signals are present. The magnitude of the sampled negative pulse of signal $\phi_D$ and consequently the magnitude of the derived identification pulse will then exhibit a corresponding reduction in magnitude, such that the identification pulse produced from one sampled negative pulse would be of insufficient magnitude to reset flip-flop 50. More than one sampled pulse would then be required to contribute to the production of an identification pulse of sufficient magnitude to reset flip-flop 50.

The ACC signal normally serves to control the gain of amplifier 12 such that the separated burst and chrominance components exhibit a predetermined magnitude in the presence of received color signal levels within a given range. In this event the magnitude of a single sampled burst representative pulse of signal $\phi_D$ produces an identification pulse sufficient to reset flip-flop 50. The condition mentioned above wherein more than one sampling cycle may be required to restore correct timing can occur when the received color signal level is below the ACC control range.

The negative-going identification pulse produced at terminal $T_{21}$ simulates a weak received signal condition, causing level detector 40 to produce an erroneous ACC signal in a direction for increasing the gain of amplifier 12 and thereby the magnitude of the signals processed by amplifier 12. The effects of this ACC action (i.e., "color blooming") are virtually imperceptible to a viewer of a displayed color image, however, since the incorrect switching condition which caused the erroneous ACC action is corrected rapidly as discussed, at which time the erroneous ACC signal is removed. The color killer circuitry is not activated during this time due to the relatively longer response time of the color killer circuitry.

While the invention has been described in terms of a preferred embodiment, it should be recognized that various modifications can be made by persons skilled in the art without departing from the scope of the invention. Component values and other examples of operating parameters have been mentioned as an aid to understanding the invention and are not intended to be limiting.

In the described preferred embodiment of FIG. 2, the ACC voltage is conveniently derived from the same circuit (34, 236, 238) which provides the burst timing identification voltage at terminal $T_{21}$. However, the ACC and identification voltages can be produced independently from separate circuits (e.g., sampling circuits of the type shown in U.S. Pat. No. 3,740,456). The response times of these separate circuits can be individually tailored to suit the specific requirements of a particular system. Illustratively, the identification circuit can be provided with a time constant for determining a fast response time in accordance with the principles discussed above, while the ACC circuit can be arranged to exhibit a relatively slower response time.

The switching mode control circuits of the invention are useful not only in PAL television receivers, but also in other PAL equipment where switching mode identification and control is required (e.g., tape recorders, cameras and picture monitors). The control concept of the invention may also be advantageously employed in conjunction with decoders in the SECAM type of color television system.

What is claimed is:

1. In a receiver for processing a color television signal including a luminance component, deflection synchronizing components at respective line and field rates, and chrominance and burst components exhibiting a prescribed mutual timing relationship and alternating in phase on a line by line basis, a chrominance channel for processing said color signal, a plurality of color demodulators for demodulating selected phases of said chrominance component, means for providing line by line switching control of one of said demodulators, and wherein proper operation of said receiver requires that said demodulator be switched in correct timing synchronism with line by line alternation of signals received by said receiver, switching control apparatus comprising:

a source of periodic trigger pulses occurring at said line rate;

timing means coupled to said switching means and responsive to said trigger pulses for providing half line frequency timing signals for determining said line by line switching;

means coupled to said chrominance channel and responsive to said burst component and said timing signals for deriving an identification signal when said demodulator switching occurs with incorrect timing synchronism, said signal deriving means exhibiting a fast response time relative to said line rate; and means for utilizing said identification signal, when present, as a supplementary trigger input to said timing means for resetting said timing means to provide timing signals corresponding to correct line by line timing synchronism.

2. Apparatus according to claim 1, wherein:
said signal deriving means comprises filter means having a short time constant relative to said line rate for establishing said response time of said signal deriving means.

3. Apparatus according to claim 1, wherein:
said chrominance channel includes detector means responsive to said burst component for providing a signal representative of said burst component; and
said signal deriving means is coupled to said detector means for deriving said identification signal from said burst representative signal.

4. Apparatus according to claim 3, wherein:
said signal deriving means includes sampling means keyed during alternate burst component intervals for alternately sampling the magnitude of said burst representative signal.

5. Apparatus according to claim 4, wherein:
said sampling means includes filter means having a short time constant relative to said line rate for establishing said response time of said signal deriving means.

6. Apparatus according to claim 3, wherein:
said timing means comprises a bistable circuit having a supplementary trigger input, said bistable circuit being reset in response to said derived identification signal when applied to said supplementary input for providing said timing signals corresponding to correct line by line timing synchronism.

7. Apparatus according to claim 1, wherein said receiver further comprises:
means coupled to said chrominance channel for automatically controlling the magnitude of signals processed by said chrominance channel in response to received signals of varying intensity, said controlling means being responsive to output signals from said signal deriving means.

8. Apparatus according to claim 7, wherein said controlling means comprises:
first means for varying the signal gain of said chrominance channel inversely relative to the level of said received color signals; and
second means for inhibiting said chrominance channel in the presence of received color signals of a magnitude below a given level, said second means exhibiting a slow response time relative to the response time of said signal deriving means.

* * * * *